United States Patent Office 3,526,886
Patented Sept. 1, 1970

3,526,886
PRECISION LOCATION DETECTOR
Joseph W. Lubich, Millvale, Pa., assignor to Westinghouse Air Brake Company, Swissvale, Pa., a corporation of Pennsylvania
Filed Mar. 26, 1968, Ser. No. 716,114
Int. Cl. G08g 1/01; G08b 21/00
U.S. Cl. 340—282                                    8 Claims

ABSTRACT OF THE DISCLOSURE

This invention relates to a precision location detector which provides an indication of the presence and passage of at least first and second signal receiving coils and a signal transmitting coil which are relatively movable with respect to each other in a predetermined path. The first signal receiving coil is positioned in a plane which is at an angle to a plane containing the second signal receiving coil, while the second signal receiving coil is positioned such that the relative movement of the signal transmitting coil and signal receiving coils in a predetermined path is normal to a plane in which the second signal receiving coil is contained. A coil signal logic means is electrically coupled to the first and second signal receiving coils, and has a coil signal logic output indication whenever the first and second signal receiving coils concurrently and relatively move past the signal transmitting coil and the second signal receiving coil has no output, while simultaneously the first signal receiving coil does have an output.

---

This invention relates to a precision location detector.

More specifically, this invention relates to a precision location detector which provides an indication of the presence and passage of at least first and second signal receiving coils and a signal transmitting coil which are relatively movable with respect to each other in a predetermined path. The first signal receiving coil is positioned in a plane which is at an angle to a plane containing the second signal receiving coil, while the second signal receiving coil is positioned such that the relative movement of the signal transmitting coil and signal receiving coils in a predetermined path is normal to a plane in which the second signal receiving coil is contained. A coil signal logic means is electrically coupled to the first and second signal receiving coils, and has a coil signal logic output indication whenever the first and second signal receiving coils concurrently and relatively move past the signal transmitting coil and the second signal receiving coil has no output, while simultaneously the first signal receiving coil does have an output.

In the past, location detectors were embodied in the form of a wayside coil tuned to a predetermined frequency. When a magnetic object entered the region of the tuned wayside coil the presence of the object would cause an imbalance in the tuned coil and this would produce an indication that an object was present. This arrangement of course could be reversed and the tuned coil could be on the moving object and the passage of the tuned coil by a metallic object would cause the imbalance in the tuned coil which would result in an indication that a specific point was passed. Both of these approaches are susceptible to the influence of stray magnetic flux fields which frequently produce incorrect indications which render these systems untrustworthy.

Other train detectors take the form of proximity detectors and these detectors are similarly influenced by stray magnetic flux fields as well as the presence of metallic objects on the wayside which affect the indication to be rendered by the detector. The invention to be described hereafter provides a remedy for these above-noted problems along with a precise indication of object detection never before consistently attainable.

It is therefore an object of this invention to provide an object detecting apparatus which employs a plurality of coils positioned such that the passage of the coils relative to each other in the presence of an electromagnetic field created by the energization of one of the coils produces a precise indication of the passage of the object which carries the coil arrangement.

Another object of this invention is to provide a unique coil arrangement that can be employed in an object detecting apparatus which produces an indication that is not affected by stray magnetic flux fields or the presence of metallic structures carried by the object to be detected or on the wayside.

In the attainment of the foregoing objects the apparatus to be described provides a precision location detector which produces an indication of the presence of the passage of at least first and second signal receiving coils and a signal transmitting coil which are relatively movable with respect to each other in a predetermined path. The first signal receiving coil is positioned in a plane which is at right angles to the second receiving coil, and, at the same time, normal to the plane containing the first signal receiving coil is perpendicular, or parallel, to a plane lying in the predetermined path. The first signal receiving coil is also parallel, or at right angles, to a plane containing the signal transmitting coil. The second signal receiving coil is positioned such that the relative movement, in the predetermined path, between the second signal receiving coil and the signal transmitting coil is normal to a plane in which the second signal receiving coil is contained. Associated with the signal receiving coils and the signal transmitting coil, is a coil signal logic which is electrically coupled to the first and second signal receiving coils and having a coil signal logic output indication whenever the first and second signal receiving coils concurrently and relatively move past the signal transmitting coil and the second signal receiving coil has no output while simultaneously the first signal receiving coil does have an output. The coil signal logic means includes a signal detecting means having outputs corresponding to outputs from the first and second signal receiving coils, and responsive to the presence or absence of output signals from the first and second signal receiving coils. Also included in the coil signal logic means is a logic circuit which is electrically coupled to the signal detecting means and includes an AND gate electrically coupled to both of the outputs from the signal detecting means and has an output which is controllably coupled to a delta time duration signal producing means which may be a one-shot multivibrator and has a delta time duration signal output. The logic circuit also includes an inverter whose input is electrically coupled to the output from the signal detecting means which corresponds to the output of the second signal receiving coil. Also within the logic circuit is an AND gate which is electrically coupled to the output, from the signal detecting means, corresponding to the first signal receiving coil output, the delta time duration signal producing means output and the output of the inverter.

Other objects and advantages of the present invention will become apparent from the ensuing description of illustrative embodiments thereof, in the course of which reference is had to the accompanying drawings in which.

Figure 3:
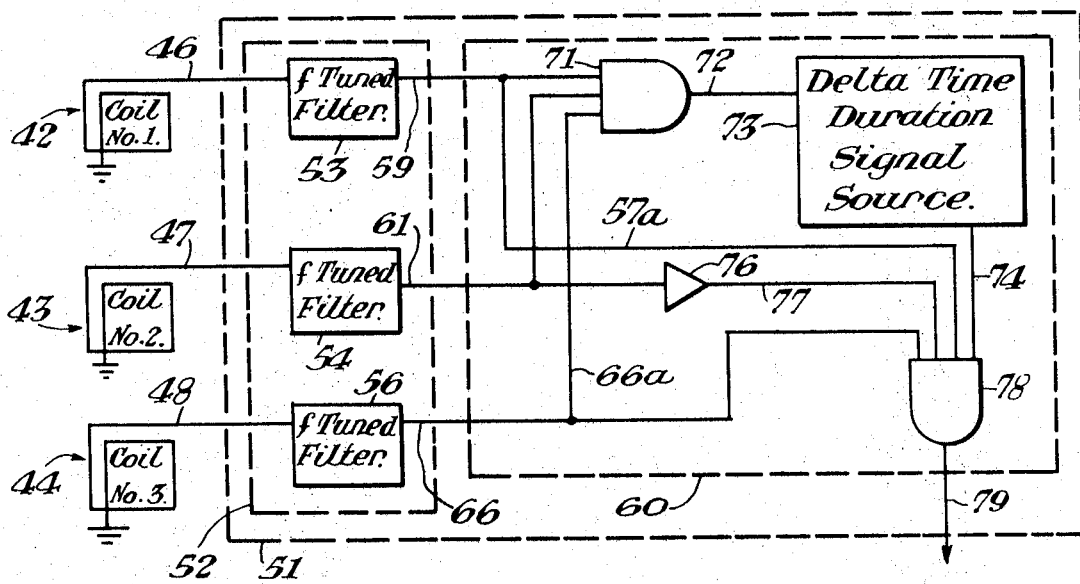

FIG. 3 sets forth a preferred embodiment of the coil signal logic means in circuit form.

Figure 4:
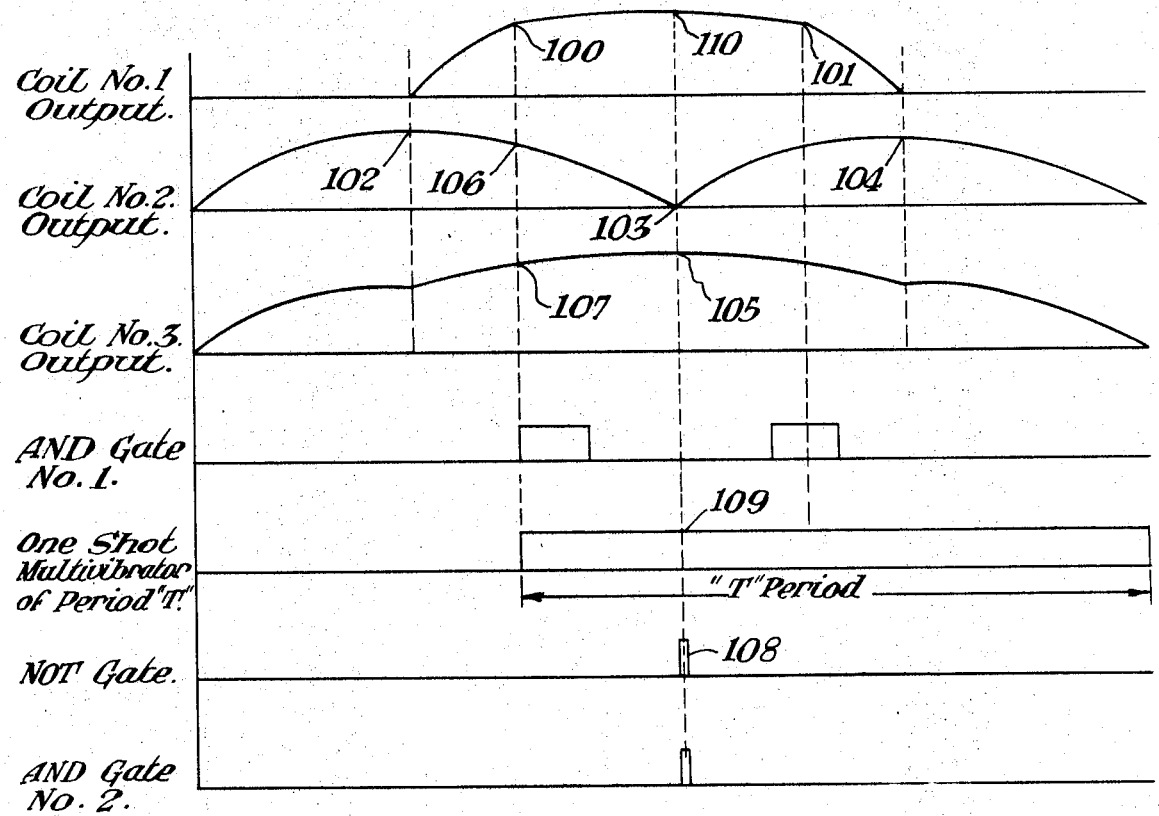

FIG. 4 depicts the evolution of a firing output signal from the coil signal logic means.

A description of the above embodiments will follow and then the novel features of the invention will be presented in the appended claims.

Figure 1:
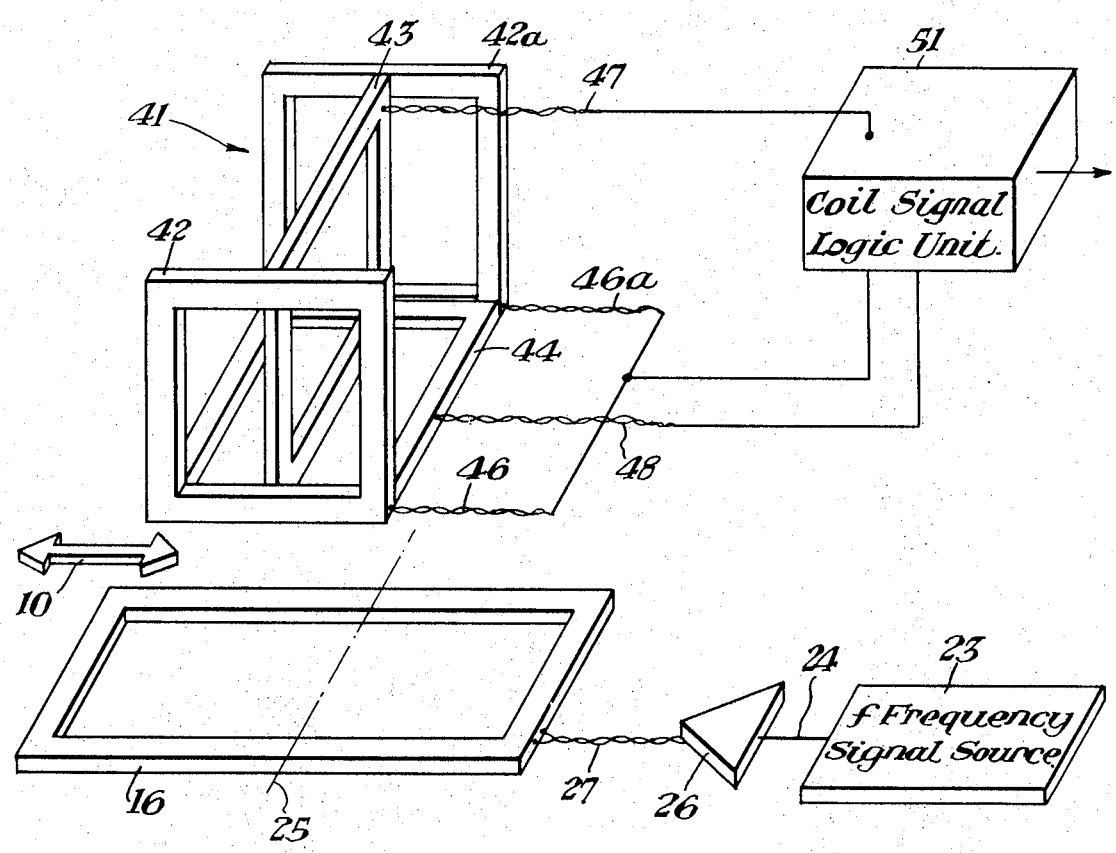
FIG. 1 illustrates in partial block diagram form a preferred embodiment of the invention.

Reference is now made to FIG. 1 in which there is illustrated in a generalized form the precision location detector referred to hereafter as a location detector. The system is basically comprised of a signal transmitting loop or coil 16 which receives its energy by way of an $f$ frequency signal source 23 delivered over lead 24 to an amplifier 26, and thence to lead 27 to energize the signal transmitting coil 16. This signal transmitting coil 16, while shown beneath the coil arrangement disposed above it, may in practice either be a stationary coil, or in the alternative the coil arangement depicted above signal transmitting coil 16 may be the stationary coil and the signal transmitting coil 16 may move relative to it, the direction of relative movement depicted by arrow 10. The coil arrangement that coacts with the flux fields that are generated by the configuration of the signal transmitting coil 16 is such that there are at least two coils, referred to hereafter as first and second signal receiving coils. In this instance the signal receiving coil 42, as well as signal receiving coil 42a will be referred to as first signal receiving coils. The need for first signal receiving coil 42a arises when there are additional electromagnetic fields present in the vicinity of the receiving coil arrangement, and this first signal receiving coil 42a provides in conjunction with first signal receiving coil 42 a balancing effect to reduce the spurious effects of the aforenoted electromagnetic flux fields that may appear in the area where the device is being used.

A second signal receiving coil 43 is positioned perpendicular to the first signal receiving coil 42 and perpendicular to the plane which contains the signal transmitting coil 16. The positioning of this second signal receiving coil 43 is of prime importance in the functioning of this invention for the reasons that will become more evident hereafter when a study of the relationship of the flux fields that appear around the signal transmitting coil 16 and the coil arrangement that is depicted above is made.

The basic requirement for the second signal receiving coil 43 is that the relative direction of travel of the coil arrangement be such that the normal to the plane containing this second signal receiving coil 43 be in the same direction that there is relative movement. In order for this invention to function it is to be understood that the relative movement between the coils be such that a predetermined path is always described by the passage of one of the set of coils or the signal transmitting coil 16.

A third signal receiving coil 44 is also illustrated here and may be utilized as a further factor in the precision location system that will be described hereafter.

Each of the signal receiving coils 42, 42a, 43 and 44 is electrically connected via electrical leads 46, 46a, 47 and 48 to a coil signal logic unit 51 which has an output indicative of the location of the coil arrangement whenever the receiving signal coil arrangement relatively moves past the center line 25 of the signal transmitting coil 16.

Figure 2:
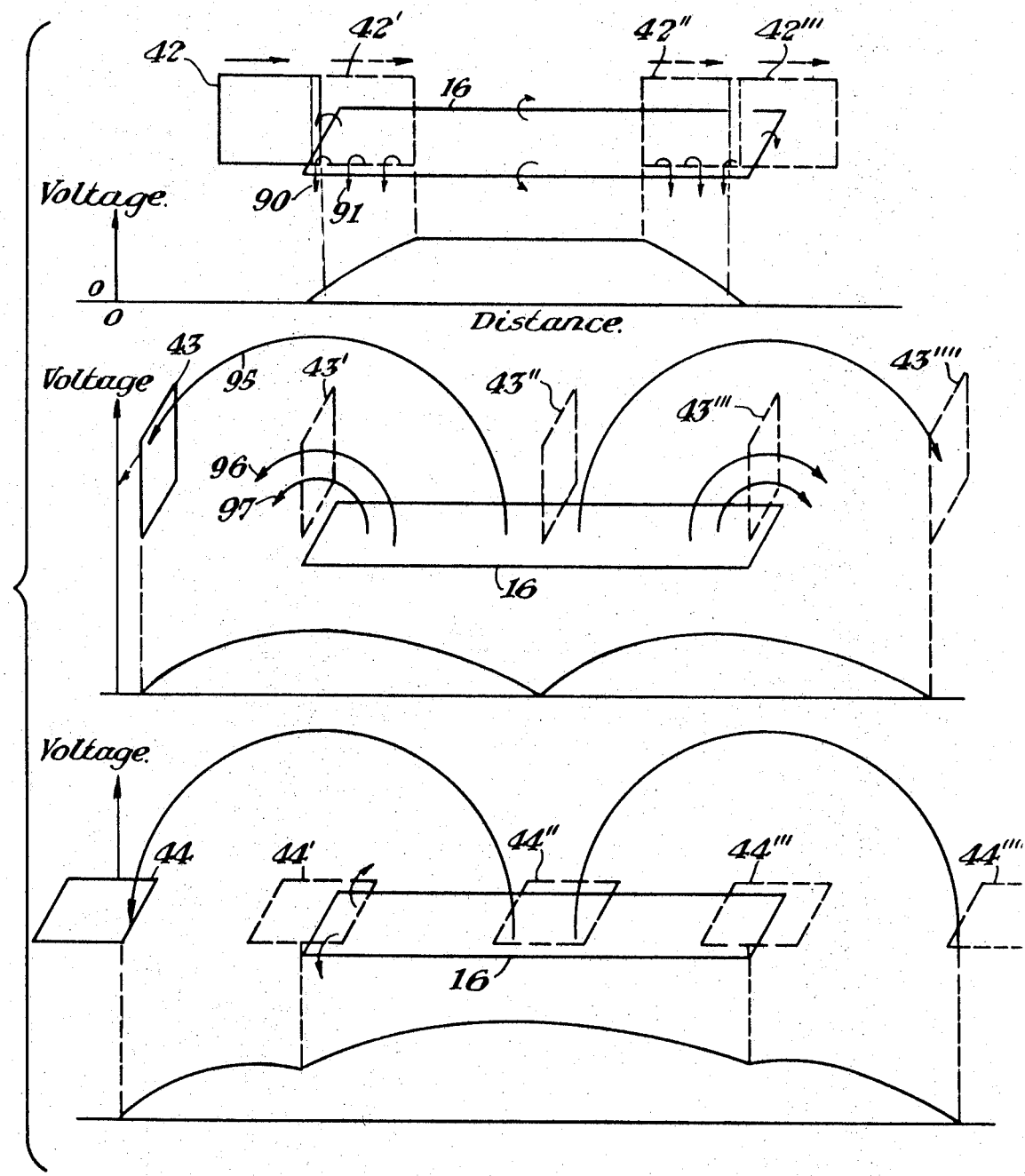
FIG. 2 illustrates signal receiving coil, signal transmitting coil magnetic flux relationship with respect to position and orientation.

Reference is now made to FIG. 2 in which there are illustrated three situations that occur when the signal receiving coils 42, 43 and 44 approach a wayside signal transmitting coil, for example, signal transmitting coil 16, as is shown in FIG. 1. At the outset it should be noted that FIG. 2 is divided into three separate parts. The uppermost portion of FIG. 2 shows the signal receiving coil 42, which has been termed a first signal receiving coil, about to enter and pass by the wayside signal transmitting coil 16. Immediately beneath the illustration depicting the first signal receiving coil 42 and the signal transmitting coil 16 is a graph plotted with voltages as the ordinate and distance as the abscissa. No values have been given to the ordinate or the abscissa since they are shown only to depict the relative changes present as the first signal receiving coil 42 passes over and past the wayside signal transmitting coil 16. It can be seen that as the first signal receiving coil 42, shown in solid outline in this upper portion of FIG. 2, is just entering over the wayside signal transmitting coil 16, at least one or more flux lines, such as 90, will pass over and through the first signal receiving coil 42.

It should be explained at this point that the flux lines that are depicted here, as well as in other figures, are shown for purposes of explanation only and are not intended to depict the actual circumstances other than in a general fashion. Accordingly, when the first signal receiving coil 42 enters over the wayside signal transmitting coil 16, it will be noted that immediately beneath the right-hand portion of the first signal receiving coil 42 the voltage begins to rise, and as the first signal receiving coil 42 assumes the dotted position 42', there are now a greater number of flux lines, such as 90 and 91, which pass through the first signal receiving coil 42. Accordingly, as this coil begins to pass over the signal transmitting coil 16 the voltage increases until it reaches a maximum when the first signal receiving coil 42 is in the position 42'. As the first signal receiving coil 42 moves relatively along and over the wayside signal transmitting coil 16 the number of flux lines passing through the first signal receiving coil 42 causes a relatively constant voltage level to appear until the first signal receiving coil 42 enters the position shown as 42'', illustrated in dotted outline to the right of the figure. Of course, the reverse function of decreasing voltage takes place for the same reasons described earlier with reference to the increasing voltage in the left-hand portion of this illustration. Finally, when the first signal receiving coil 42 assumes the position 42''', the voltage drops to zero.

Before continuing with an explanation of the voltage patterns that appear with reference to the passage of the other coils referred to earlier, it should be noted that the voltage patterns that appear, one of which has just been described, are significant to the invention and the voltage values of these curves will be utilized as the additional criterion upon which to base a final determination of the detection of an object carrying the coil arrangement 41.

Reference will now be made to the passage of the signal receiving coil 43, which is referred to hereafter as the second signal receiving coil. This second signal receiving coil 43 must always travel in a path such that the plane of the coil is normal to the direction of travel. This is a requirement of the invention. Specifically, when the second signal receiving coil 43 is relatively approaching the wayside signal transmitting coil 16, one can see that at least some, and in this case only one illustrated flux line 95 passes through the second signal receiving coil 43 when it is a significant distance from the signal transmitting coil 16. When this occurs the voltage starts to increase and as the second signal receiving coil 43 goes from the left to the right more of the flux lines pass through the second signal receiving coil 43 increasing the voltage as the second signal receiving coil 43 moves to the right. Accordingly, when the second signal receiving coil 43 assumes the position 43' shown in dotted outline, the flux lines, such as 96 and 97, will establish the greatest concentration of flux lines within the second signal receiving coil 43 and the voltage will reach its peak as the second signal receiving coil 43 passes over the left-hand end of the signal transmitting coil 16. As the second signal receiving coil 43 moves on toward the center of the signal transmitting coil 16 to the position shown at $\overline{43''}$, the voltage will decrease because, as is well known, the rectangular-shaped coil will have flux paths which, if shown in a three-dimensional fashion, would describe a doughnut shaped configuration with the central portion of the coil being the hole of the doughnut.

In this instance we have shown but a few of the flux lines for purposes of illustrating the fact that when the second signal receiving coil 43 is midway between the end points of signal transmitting coil 16, little or no flux lines pass through the signal receiving coil 43 and therefore no voltage is induced in the second signal receiving coil 43 when in the position 43″. At this point the voltage drops to zero, or as may be referred to reaches a null point, and then as the second signal receiving coil 43 moves toward the position 43‴, the voltage increases to a maximum for the same reasons that were set forth with reference to the coil when it was in position 43′ and then eventually the voltage decreases to zero when the coil reaches the position 43⁗.

Reference is now made to the illustration depicted at the base of FIG. 2. In this illustration there is shown a third signal receiving coil 44, that is, a coil which travels in a plane parallel to the plane which contains the wayside signal transmitting coil 16. It will be evident that since this coil is in a plane parallel to the wayside signal transmitting coil 16, the flux lines will tend to enter this coil slightly before they would effectively enter the vertically disposed second signal receiving coil 43, shown in the illustration just above. As a practical matter there would be induced in the third signal receiving coil 44 a voltage which would increase until the third signal receiving coil 44 assumed a position 44′, at which point, because of the physical relationship of the third signal receiving coil 44 of the wayside signal transmitting coil 16, there would be a minor dip in the voltage due to the cancellation of certain voltages due to the flux lines entering and passing through the third signal receiving coil 44. This small reduction in voltage level is of no consequence to the invention because, as will be appreciated hereafter, as the third signal receiving coil 44 enters the center position 44″, the voltage increases steadily over this middle range as the third signal receiving coil 44 passes from the left-hand to the right-hand side of the wayside signal transmitting coil 16 and, of course, when the third signal receiving coil 44 reaches a position 44‴, again there is a minor dip in the voltage. Finally, when the third signal receiving coil 44 reaches a position 44⁗, the voltage drops to zero.

At this point all of FIG. 2 should be reviewed with the thought of noting the following factors. Note, in the middle of a signal transmitting coil passage that when the second signal receiving coil 43 is in the position 43″, which is the middle of the signal transmitting coil, the voltage induced in this coil has dropped to zero or a null point, while in the first signal receiving coil 42, and the third signal receiving coil 44, which coils are in the central position, the voltage is at a peak level. It is the presence of these peak level voltages simultaneously appearing with a null which will be utilized in the description that follows with reference to FIG. 3 that allows this invention to produce the precision indication of the passage of the multiplanar coil proximity detector 41.

Reference is now made to FIG. 3 which illustrates in a partial schematic circuit diagram, as well as a block diagram, the details of the equipment only shown in block diagram form in FIG. 1. Accordingly, it will be seen at the left-hand portion of this figure that there are present the signal receiving coil 42, which is referred to as the first coil, the signal receiving coil 43, which is referred to as the second coil, and the signal receiving coil 44, which is referred to as the third coil. Each of these signal receiving coils 42, 43 and 44 is electrically coupled to the coil signal logic unit 51 by leads 46, 47 and 48, respectively, the coil signal logic unit 51 being shown in dotted outline in this figure. The leads 46, 47 and 48 from the signal receiving coils 42, 43 and 44 also enter the signal detection unit 52, referred to hereafter as a signal detecting means. The signal detecting means 52 has a series of tuned filters 53, 54 and 56, the tuned filters being tuned to a number of frequencies, and specifically frequency $f$, which is the frequency signal transmitted by signal transmitting coil 16, is the operating parameter in FIG. 3. Accordingly, tuned filter 53 has output lead 57, while tuned filter 54 has output lead 61, and the tuned filter 56 has output lead 66. Each of the outputs from the tuned filters 53, 54 and 56 will be fed to the logic detection circuit for frequency $f$, which is to the right of signal detecting means 52 and is designated by the reference numeral 60 and is shown in dotted outline in this figure. Accordingly, the logic circuit for the $f$ frequency contains an AND gate 71 which is electrically coupled respectively to the tuned filters 53, 54 and 56 by leads 57 and 57a to tuned filter 53, by leads 61 and 61a to tuned filter 54, and by leads 66 and 66a to tuned filter 56.

The AND gate 71 has an output lead 72 which is delivered to a one-shot multivibrator having a "T" period. This one-shot multivibrator, which has been selected for use in this circuit, will be referred to hereafter as a delta time duration signal source for it should be understood that there are many types of devices that can provide a signal of a given period. For example, a clock might be employed. The delta time duration signal source 73 has an output lead 74 which is electrically coupled to an AND gate 78. The AND gate 78 is electrically connected to tuned filter 53 via the leads 57 and 57a, and the AND gate 78 is also electrically coupled to the tuned filter 56 via the lead 66, and it will be noted that the tuned filter 54 is electrically coupled to the AND gate 78 via a circuit including the lead 61, an inverter 76, and lead 77. The output from the logic circuit 60 is represented by the lead from the AND gate 78 and is, in this instance, lead 79.

Immediately beneath FIG. 3 is FIG. 4. It will be noted that FIG. 4 contains a series of timing charts, and a review of the first three lines of the timing charts of FIG. 4 will show that the curves that are present there are indicative of voltage variations as the signal receiving coils 42, 43 and 44 pass by a wayside signal transmitting coil. Note that these voltage patterns that appear on the first three lines of the timing chart are the same curves that were generated in FIG. 2, and for that reason the manner in which they were derived will not be explained now but it will be assumed that their presence does take place in the fashion set forth earlier with reference to FIG. 2. A functional study now will be made of what happens when the location detector reaches a detection point.

It will be assumed that the signal receiving coil arrangement is just about to relatively approach the signal transmitting coil 16 which has been delivered an $f$ frequency signal. In this instance, the signal receiving coils 42, 43 and 44 disposed above the track will be approaching the signal transmitting coil 16 and as they receive the signals delivered by the $f$ frequency source, these signals will enter the tuned filters 53, 54 and 56 over the leads 46, 47 and 48, respectively, and from each of these tuned filters there will be an output. This output will be of the type shown on the first three lines of FIG. 4.

It will be appreciated that the output from the tuned filter 53 reaches its peak at point 100 on the curve and continues at a peak to point 101 on the curve, and then falls off to zero, as explained earlier. In a similar fashion the output from the tuned filter 54, which is indicative of the signal generated in the second signal receiving coil 43, will reach a peak at point 102 on the curve illustrated on the second line and will reach a null point or zero value at a point 103 on the curve and then reach another maximum at the point 104 on this curve, after which, when the signal receiving coil 43 passes the signal transmitting coil 16, the voltage will drop to zero.

Also, it will be seen from line 3, on which is shown the graphic representation of the voltage pattern that appears at the output from the tuned filter 56, that the voltage pattern is representative of the signal generated in the third signal receiving coil 44 and delivered to the tuned filter 56 via the lead 48, and that at the point 105 the voltage is at a maximum which is all that need be noted for the purpose of simplification. Accordingly, if one will view the timing charts set forth in FIG. 4 as representing real time starting on the left and going to the right, one can see that the outputs from leads 57, 61a and 66a are all delivered to the AND gate 71. This is termed a first gate, and when the voltage level on these leads entering AND gate 71 reaches a voltage level designated by the reference numerals 100, 106 and 107, there will be present on the AND gate an all positive condition. When this occurs the AND gate will function in a normal fashion producing an output pulse which has been graphically illustrated on line 4 of the timing chart as a square wave pulse. The pulse with its leading edge will be delivered over the lead 72 to the delta time duration signal source 73 which in this instance has been selected to be a one-shot multivibrator having a period "T" which is of sufficient length so that the system will operate with the slowest moving vehicle that may be anticipated to enter the system. The need for the selection and length "T" of the period will become more evident as the description ensues.

The output from the delta time duration signal source 73 will appear on the lead 74, and as represented by the signal of "T" period length shown on the fifth line of the timing chart.

Continuing now with the description, as the signal receiving coil arrangement relatively passes over the signal transmitting coil and reaches a midpoint in its travel, it will be seen that at the first gate 71 there will be present on the lead 57 a peak voltage designated by the reference numeral 110, while on the leads 61 and 61a from the tuned filter 54, which is electrically coupled to the second signal receiving coil 43, the voltage will be zero or at a null point, designated by the numeral 103, while the voltage on the leads 66 and 66a from the tuned filter 56 and its signal receiving coil 44 will be at a peak designated by the reference numeral 105. It is therefore apparent that there is no longer present at the AND gate a condition which will allow the AND gate to produce an output which of course is reflected by the absence of a signal on line 4 of the timing chart referred to as the AND gate 71.

At this very instant when the signal goes to zero on the lead 61 from the tuned filter 54, the inverter 76, or the NOT gate as it may be termed, will see a zero signal which in turn will produce a positive output from the gate 76, referred to as a second gate hereafter, on the lead 77, and this condition is depicted on line 6 of the timing chart by the pulse 108. At this very instant there are going to be a number of simultaneous conditions present at the third gate 78 which is also an AND gate. It will be noted that at this point in time there is a positive output on the lead 57 which has been designated by the point 110 on the curve of line 1 of the timing chart, and this positive condition will be carried to the gate 78 over the leads 57 and 57a. Note also that the output from the one-shot multivibrator at a point in time, designated by the reference numeral 109 on line 5 of the timing chart, is also in a positive condition and that the output from the third signal receiving coil 44, which is delivered over lead 66 to the third gate 78, is also in a positive condition which is indicated at point 105 on the curve shown on line 3 of the timing chart, and that finally the output from the second gate 76, which is a NOT gate or inverter, has delivered over the lead 77 to the third gate 78 a positive pulse designated by the pulse 108 on line 6 of the timing chart. Therefore, it will be seen that there are required to be present at the gate 78 four separate coinciding conditions before the third gate 78 will produce an output on the lead 79. This will only occur at the precise moment that the output from the second signal receiving coil 43 reaches a zero point and both first and third signal receiving coils 42 and 44, respectively, have simultaneously induced in them a positive signal which has been preceded by the coils having reached some preselected voltage which causes the delta time duration signal source to produce its output which lends itself as an additional factor or criterion upon which to make a definitive determination of when the signal receiving coil arrangement has reached the exact midpoint of the signal transmitting coil.

In view of the above description it is readily apparent that the detector takes into account significantly more criteria in the determination of the precise midpoint of a signal transmitting coil which may then be used as a reference for further operations.

While the invention has been shown and described with reference to a preferred embodiment thereof, it will be understood by those skilled in the art that other modifications may be made therein without departing from the spirit and scope of the invention.

Having thus described my invention, what I claim is:

1. A precision location detector to provide an indication of the presence of a first and second means relatively movable with respect to each other in a predetermined path,
 (a) said first means having a signal transmitting coil,
 (b) said second means having at least first and second signal receiving coils,
  said first signal receiving coil positioned in a plane which is at an angle to a plane containing said second signal receiving coil,
  said second signal receiving coil positioned such that said relative movement in said predetermined path is normal to a plane in which said second signal receiving coil is contained,
 (c) coil signal logic means electrically coupled to said first and said second signal receiving coils and having a coil signal logic output indication whenever said first and said second signal receiving coils concurrently and relatively move past said signal transmitting coil and said second signal receiving coil has no output while simultaneously said first signal receiving coil does have an output.

2. The precision location detector of claim 1 wherein a normal to said plane containing said first signal receiving coil is perpendicular to a plan lying in said predetermined path.

3. The precision location detector of claim 2 wherein said plane of said first signal receiving coil is parallel to a plane containing said signal transmitting coil.

4. The precision location detector of claim 2 wherein said plane of said first signal receiving coil is at right angles to a plane containing said signal transmitting coil.

5. The precision location detector of claim 1 wherein said coil signal logic means includes a signal detecting means having outputs corresponding to first and second signal receiving coil outputs and responsive to the presence or absence of said output signals from said first and second signal receiving coils.

6. The precision location detector of claim 5 wherein said coil signal logic means also includes a logic circuit which is electrically coupled to said signal detecting means.

7. The precision location detector of claim 6 wherein said logic circuit includes a first gate electrically coupled to both of said outputs from said signal detecting means, said first gate having an output controllably coupled to a delta time duration signal producing means which has a delta time duration signal output,
 a second gate having an output and an input, said second gate input electrically coupled to said output from said signal detecting means corresponding to said output to said second signal receiving coil,
 a third gate electrically coupled to said output from said signal detecting means corresponding to said first signal receiving coil output, said delta time duration signal producing means output, and said output from said second gate.

8. The precision location detector of claim 7 wherein said first and third gates are AND gates and said second gate is an inverter.

References Cited

UNITED STATES PATENTS 3,189,885   6/1965   Shields.

THOMAS B. HABECKER, Primary Examiner

J. M. BOBBITT, Assistant Examiner

U.S. Cl. X.R.

324—41; 336—129; 340—38

PO-1050
(5/69)

UNITED STATES PATENT OFFICE
CERTIFICATE OF CORRECTION

Patent No. 3526886      Dated September 1, 1970

Inventor(s) Joseph W. Lubich

It is certified that error appears in the above-identified patent and that said Letters Patent are hereby corrected as shown below:

Column 8, line 42, "plan" should be --plane--

SIGNED AND
SEALED
NOV 3 1970

(SEAL)
Attest:

Edward M. Fletcher, Jr.
Attesting Officer

WILLIAM E. SCHUYLER, JR.
Commissioner of Patents